United States Patent [19]

Zhukovsky et al.

[11] 4,122,380
[45] Oct. 24, 1978

[54] STEP MOTOR CONTROL SYSTEM

[76] Inventors: Evgeny Grigorievich Zhukovsky, ulitsa Rumyantseva, 7, kv. 69; Vyacheslav Mikhailovich Lobanov, ulitsa Przhevalskogo, 2, kv. 28; Vladimir Danilovich Rozgon, ulitsa Krasnogvardeiskaya, 26, kv. 31; Dmitry Leonidovich Roitman, ulitsa Rumyantseva, 13, kv. 53, all of Smolensk, U.S.S.R.

[21] Appl. No.: 793,713

[22] Filed: May 4, 1977

[51] Int. Cl.² ............................................. G05B 19/40
[52] U.S. Cl. .................................................... 318/696
[58] Field of Search ................. 318/696, 685, 254, 138

[56] References Cited

U.S. PATENT DOCUMENTS

| | | | |
|---|---|---|---|
| 3,842,332 | 10/1974 | Heine et al. | 318/696 |
| 3,991,355 | 11/1976 | Reehil et al. | 318/696 |
| 4,028,600 | 6/1977 | Blaschke et al. | 318/696 |

Primary Examiner—Herman J. Hohauser
Attorney, Agent, or Firm—Lackenbach, Lilling & Siegel

[57] ABSTRACT

The step motor control system comprises triggers and a trigger starting and switching sequence preselection unit. The unit inputs are connected to a second output of each trigger, and the outputs are connected to the inputs of each trigger. The system also includes a decoder of inoperative states of the triggers and power amplifiers. The unit comprises a trigger starting circuit for setting up the amount of rotation of the step motor shaft comprising an individual bus connected to timing inputs of the triggers and means for trigger switching sequence preselection for setting up the rotational direction of the shaft. Said means has a first group of NAND gates, the number of gates being equal to the number of triggers, each gate having its first input connected to the second output of one of the triggers, and its second input connected to the bus for setting up the shaft's rotational direction. Each grate's output is directly connected to a first data input and, via individual NAND gates, to a second data input of one of the remaining triggers, the first group enabling a direct sequence of switching the motor windings. Said means also has a second group of NAND gates, the number of gates being equal to the number of triggers, each gate having a first input connected to the second output of one of the triggers, a second input connected, via an individual NAND gate, to the bus for setting up the shaft's rotational direction, and an output connected directly to the first data input and, via the individual NAND gates effecting the connection of the outputs of each NAND gate of the first group to the second data input of one of the remaining triggers, to the second data input of one of the remaining triggers, the second group enabling a reversed sequence of switching the motor windings.

2 Claims, 4 Drawing Figures

STEP MOTOR CONTROL SYSTEM

The present invention relates to programmed control systems for equipment, and, more particularly, to step motor control systems and may be used in numerical control systems for controlling various pieces of equipment and for graphic data encoders.

Step motor control systems are widely known in the art. Such systems comprise control triggers with OR gates being connected to the trigger inputs. Delay circuits and AND gates are connected to the OR gates outputs. Control pulses are fed to the AND and OR gates from pulse formers connected to the AND and OR gates. The control trigger outputs are electrically coupled, by means of power amplifiers, to the step motor windings. The above-described step motor control systems have a number of disadvantages. Due to the use of different types of gates and the presence of reactive members, such systems have low reliability and noise stability.

Known in the art are step motor control systems (of. USSR Inventor's Certificate No. 297099 G 05 b 19/40), which enable switching of a three-phase step motor in a six-cycle pattern. They comprise triggers and a trigger starting and switching sequence preselection unit effecting the setting up of the rotational direction the amount of rotation of the step motor shaft. The trigger outputs are connected to power amplifiers and to a decoder of inoperative states having its outputs connected to the trigger inputs via OR gates. Such systems also include three pairs of NAND gates for direct sequence receiving clock pulses at one input of each gate. A second input of each of these gates is connected to an output of each of the remaining triggers. Outputs of the NAND gates are connected, via OR gates, to the trigger inputs. Such systems also include three pairs of NAND gates for reversed sequence, each gate having a first input receiving clock pulses. A second input of each of these gates is connected to an output of each of the triggers, and outputs of these gates are connected, via OR gates, to the trigger inputs.

These systems are deficient in low noise stability and have a low reliability due to the presence of reactive members and gates of different types, as well as in that they cannot be build in the form of a single integrated circuit. In addition the employment of such systems for effecting a more complicated sequence of switching of step motors having a large number of phases results in a considerable redunduncy of hardware and a lower reliability of the control system.

It is an object of the invention to improve noise stability and reliability of the control system.

Another object of the invention is to provide for changing from one pre-set switching sequence of phases of a step motor to another sequence without increasing the hardware and lowering the reliability of the system.

The above objects are accomplished by a step motor control system comprising triggers, a trigger starting and switching sequence preselection unit for setting up the rotational direction and the amount of rotation of the step motor shaft, the unit having its inputs connected to a second output of each of the triggers and its outputs connected to inputs of each of the triggers, a decoder of inoperative states of the triggers having inputs connected to outputs of the triggers and an output connected to a first data input of one of the triggers, and power amplifiers having inputs connected to outputs of the triggers and outputs connected to the step motor windings according to the invention. The trigger starting and switching sequence preselection unit includes a trigger starting circuit for setting the amount of rotation of the step motor shaft, the circuit comprising an individual bus connected to timing inputs of the triggers, and means for preselection of trigger switching sequence and for setting the rotational direction of the step motor shaft, said means having a first group of NAND gates for a direct switching sequence of the step motor windings in which the number of NAND gates is equal to the number of triggers, each of the gates being connected by a first input thereof to the second output of one of the triggers, by a second input thereof to the bus for setting up the rotational direction of the step motor shaft, and by an output thereof directly to the first data input and, via individual NAND gates, to a second data input of one of the remaining triggers, said means having a second group of NAND gates for a reversed switching sequence of the step motor windings in which the number of NAND gates is equal to the number of the triggers, each of the gates being connected by a first input thereof to a second output of one of the triggers, by a second input thereof, via an individual NAND gate, to the bus for setting up the rotational direction of the step motor shaft, and by an output thereof directly to the first data input and, via the individual NAND gates, which connect each of the NAND gates of the first group to the second data input of one of the remaning triggers, to the second data input of one of the remaining triggers.

In order to provide for a simple change from one pre-set switching sequence of phases of a step motor to another, it is advantageous that in a step motorcontrol system comprising six triggers for twelve-cycle and six-cycle switching sequences of the step motor windings, according to the invention, each of the triggers additionally has two setting inputs, a first or a second of the setting inputs being connected to an output of a decoder of inoperative states of the triggers for setting the triggers in one of the operative states determined by a pre-set switching sequence of the step motor windings, and each of the NAND gates of the second group of said means for trigger switching sequence preselection and for setting up the rotational direction of the step motor shaft having an additional input connected to outputs of respective triggers, every second NAND gate of the first group and every second NAND gate of the second group of said means for trigger switching sequence preselection and for setting up the rotational direction of the step motor shaft having still another additional input connected to the common bus receiving a control signal for changing the system for twelve-cycle or six-cycle switching sequence of the step motor windings.

This construction of the step motor control system according to the invention considerably improves the noise stability and reliability of the system, and enables the change from one pre-set switching sequence of the step motor phases to another without increasing the hardware and lowering the reliability of the system.

The invention will now be described with reference to specific embodiments thereof illustrated in the accompanying drawings, in which.

Figure 1:
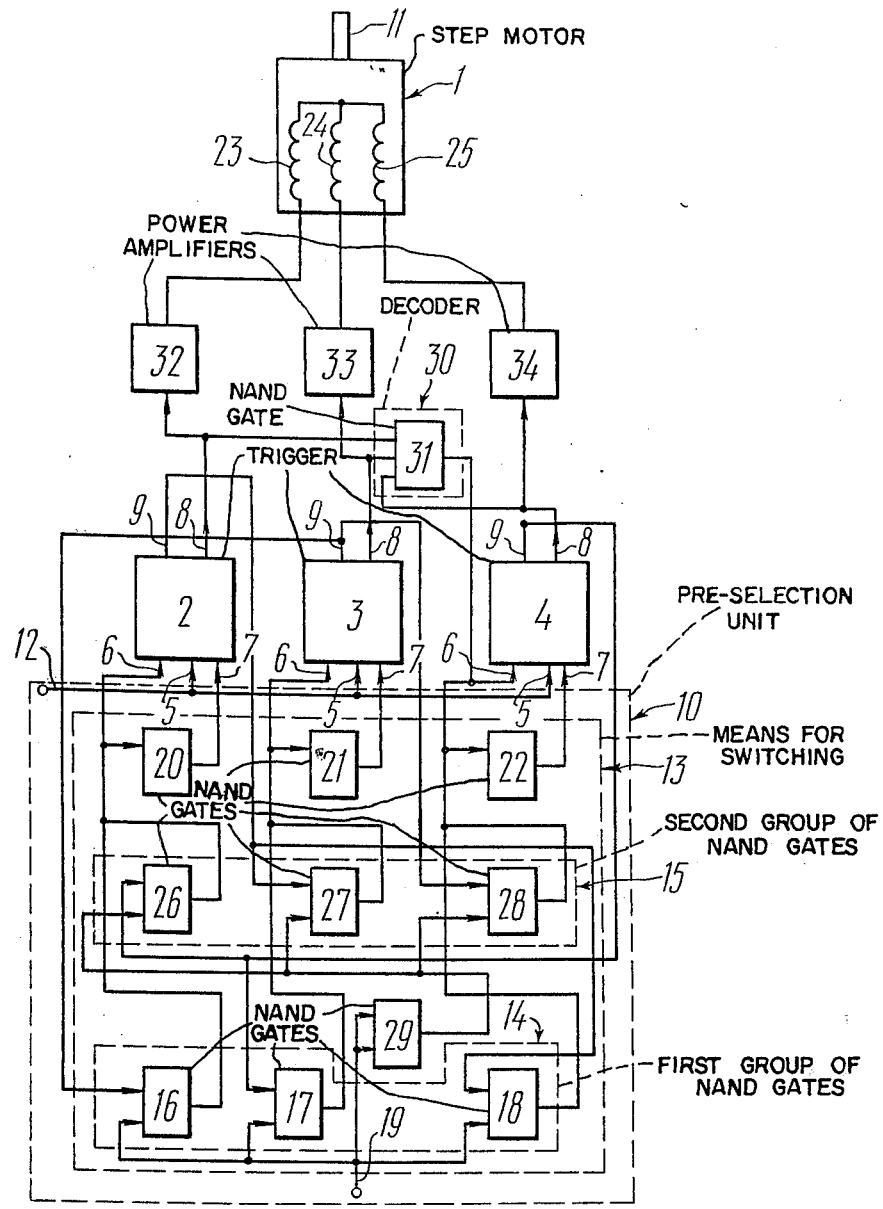
FIG. 1 is a block diagram of a three-phase step motor control system according to the invention.

The step motor control system shown in FIG. 1 is designed for controlling a three-phase step motor 1 in accordance with a six-cycle pattern. The system comprises three triggers 2, 3, 4. Each of the triggers 2, 3, 4 has a timing input 5, a first, data input 6, a third, data input 7, a first output 8 and a second output 9. The system for controlling the step motor 1 also comprises a trigger starting and switching sequence preselection unit 10 for setting up the rotational direction and the amount of rotation of a shaft 11 of the step motor 1. The trigger starting and switching sequence preselection unit 10 consists of a circuit 12 for starting the trigers 2, 3, 4 for setting up the amount of rotation of the shaft 11 of the step motor 1 and means 13 for trigger switching sequence preselection for setting up the rotational direction of the shaft 11 of the step motor 1. The trigger starting circuit 12 for setting up the amount of rotation of the shaft 11 of the step motor 1 comprises an individual bus receiving a train of clock pulses, the number of pulses determining the amount of rotation of the shaft 11 of the step motor 1. The trigger starting circuit 12 is connected to the timing inputs 5 of the triggers 2, 3, 4.

The means 13 for trigger switching sequence preselection and for setting up the rotational direction of the shaft 11 of the step motor 1 comprises a first group 14 of NAND gates and a second group 15 of NAND gates. The first group 14 of NAND gates includes three NAND gates 16, 17, 18 corresponding to the number of the triggers 2, 3, 4. Each of the NAND gates 16, 17, 18 has two inputs and one output.

The second input of each of the NAND gates 16, 17, 18 of the first group 14 is connected to a bus 19 for setting up the rotational direction of the shaft of the step motor which receives information from a computer (not shown) on the required rotational direction of the shaft 11 of the step motor 1.

The first input of the NAND gate 16 is connected to the output 9 of the trigger 3. The output of the NAND gate 16 is connected directly to the first data input 6 of the trigger 2 and, via an individual NAND gate 20 having one input and one output, to the second data input 7 of the trigger 2.

The first input of the NAND gate 17 is connected to the output 9 of the trigger 4. The output of the NAND gate 17 is connected directly to the first data input 6 of the trigger 3 and, via an individual NAND gate 21 having one input and one output, to the second data input 7 of the trigger 3.

The first input of the NAND gate 18 is connected to the output 9 of the trigger 2. The output of the NAND gate 18 is connected directly to the first data input 6 of the trigger 4 and, via an individual NAND gate 22 having one input and one output, to the second data input 7 of the trigger 4.

This connection of the NAND gates 16, 17, 18 of the group 14 is determined by the pre-set switching sequence of windings 23, 24, 25 of the step motor 1.

The first group 14 of NAND gates of means 13 for trigger switching sequence preselection enables a direct switching sequence of the windings 23, 24, 25 of the step motor 1.

The second group 15 of NAND gates of means 13 for trigger switching sequence preselection comprises three NAND gates 26, 27, 28, each having two inputs and one output, the number of gates corresponding to the number of triggers 2, 3, 4. The second input of each of the gates 26, 27, 28 of the group 15 is connected, via an individual NAND gate 29 having two inputs and one output, to the bus 19 for setting up the rotational direction of the step motor shaft.

The first input of the NAND gate 26 of the second group 15 is connected to the output 9 of the trigger 4 and to the first input of the NAND gate 17 of the first group 14. The output of the NAND gate 26 is connected directly to the first data input 6 of the trigger 2, to the output of the NAND gate 16 of the first group 14 and, via the individual NAND gate 20, to the second data input 7 of the trigger 2.

The first input of the NAND gate 27 is connected to the output 9 of the trigger 2 and to the first input of the NAND gate 18 of the first group 14. The output of the NAND gate 27 is connected directly to the first data input 6 of the trigger 3, to the output of the NAND gate 17 of the first group 14 and via the individual NAND gate 21, to the second data input 7 of the trigger 3.

The first input of the NAND gate 28 is connected to the output 9 of the trigger 3 and to the first input of the NAND gate 16 of the first group 14. The output of the NAND gate 28 is connected directly to the first data input 6 of the trigger 4 and, via the individual NAND gate 22, to the second data input 7 of the trigger 4.

This connection of the NAND gate 26, 27, 28 of the group 15 is also determined by the pre-set pattern of switching sequence of the windings 23, 24, 25 of the step motor 1.

The second group of NAND gates of the means 13 for trigger switching sequence preselection enables a reversed switching sequence of the windings 23, 24, 25 of the step motor 1.

The system for controlling the step motor 1 also includes a decoder 30 of the inoperative states of triggers which effects setting of the triggers 2, 3, 4 in one of the operative states depending on the pre-set switching sequence of the windings 23, 24, 25 of the step motor 1. The decoder 30 of inoperative states of the triggers comprises one NAND gate 31 having three inputs and one output.

The output 8 of the trigger 2 is connected to the first input of the NAND gate 31 of the decoder 30 of inoperative states of the triggers and to an input of a power amplifier 32. The output 8 of the trigger 3 is connected to the second input of the NAND gate 31 of the decoder 30 of inoperative states of the triggers and to an input of a power amplifier 33. The output 8 of the trigger 4 is connected to the third input of the NAND gate 31 of the decoder 30 of inoperative states of the triggers and to an input of a power amplifier 34. The output of the NAND gate 31 is connected to the first data input of the trigger 4.

The outputs of the power amplifiers 32, 33, 34 are connected to the windings 23, 24, 25 of the step motor 1, respectively.

Figure 2:
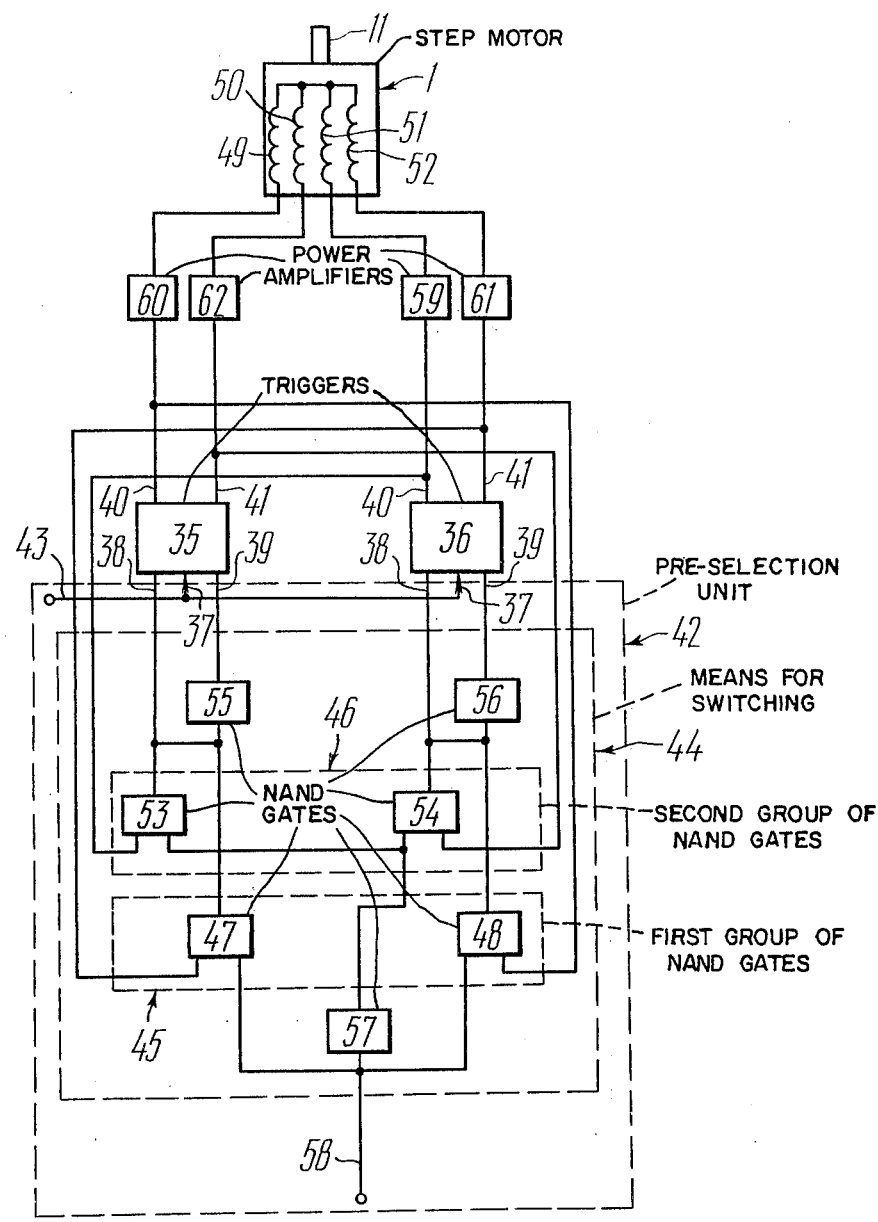
FIG. 2 is a block diagram of a four-phase step motor control system according to the invention.

The step motor control system shown in FIG. 2 is designed for controlling a four-phase step motor in accordance with a four-cycle pattern. The system comprises two triggers 35, 36. Each of the triggers 35, 36 has a timing input 37, a first data input 38, a second data input 39, and outputs 40 and 41.

The step motor control system comprises a trigger starting and switching sequence preselection unit 42 for setting up the rotational direction and the amount of rotation of the shaft 11 of the step motor 1. The trigger starting and switching sequence preselection unit 42 consists of a trigger starting circuit 43 for setting up the amount of rotation of the shaft 11 of the step motor 1 and means 44 for trigger switching sequence preselection and for setting up the rotational direction of the shaft 11 of the step motor 1. The trigger starting circuit 43 for setting up the amount of rotation of the shaft 11 of the step motor 1 comprises an individual bus receiving a train of clock pulses, the number of pulses determining the amount of rotation of the shaft 11 of the step motor 1. The trigger starting circuit 43 is connected to the timing inputs 37 of the triggers 35, 36.

The means 44 for trigger switching sequence preselection and for setting up the rotational direction of the shaft 11 of the step motor 1 comprises a first group 45 of NAND gates and a second group 46 of NAND gates.

The first group 45 of NAND gates comprises two NAND gates 47, 48 in this embodiment each of which has two inputs and one output. The number of gates in the group 45 corresponds to the number of triggers 35, 36. This group enables a direct switching sequence of the windings 49, 50, 51, 52 of the step motor 1.

The second group 46 of NAND gates comprises two NAND gates 53, 54 in this embodiment, each of which has two inputs and one output. The number of gates in the group 46 corresponds to the number of triggers 35, 36. This group enables a reversed switching sequence of the windings 49, 50, 51, 52 of the step motor 1. In addition, means 44 comprises individual NAND gates 55, 56 for feeding pulses to the second data inputs 39 of the triggers 35 and 36 and an individual NAND gate 57 having its input connected to a bus 58 for setting up the rotational direction of the shaft 11 of the step motor 1.

A first input of the NAND gate 47 is connected to the output 41 of the trigger 36. The output of the NAND gate 47 is connected directly to the first data input 38 of the trigger 35 and, via the individual NAND gate 55, to the second data input 39 of the trigger 35.

A first input of the NAND gate 48 is connected to the output 40 of the trigger 35. The output of the NAND gate 48 is connected directly to the first data input 38 of the trigger 36 and, via the individual NAND gate 56, to the second data input 39 of the trigger 36.

The second inputs of the NAND gates 47, 48 of the first group 45 are connected to the bus 58 for setting up the rotational direction of the step motor shaft which receives information from a computer (not shown) on the required rotational direction of the shaft 11 of the step motor 1.

A first input of the NAND gate 53 of the second group 46 is connected to the output 40 of the trigger 36. The output of the NAND gate 53 is connected directly to the first data input 38 of the trigger 35, to the output of the NAND gate 47 of the first group 45 and, via the individual NAND gate 55, to the second data input 39 of the trigger 35.

A first input of the NAND gate 54 of the second group 46 is connected to the output 41 of the trigger 35. The output of the NAND gate 54 is connected directly to the first data input 38 of the trigger 36, to the output of the NAND gate 48 of the first group 45 and, via the individual NAND gate 56, to the second data input 39 of the trigger 36.

Second inputs of the NAND gates 53, 54 of the second group 46 are connected, via the individual NAND gate 57, to the bus 58 for setting up the rotational direction of the step motor shaft.

The output 40 of the trigger 36 is connected to a power amplifier 59, the output 40 of the trigger 35 is connected to a power amplifier 60, the output 41 of the trigger 36 is connected to a power amplifier 61 and the output 41 of the trigger 35 is connected to a power amplifier 62.

The power amplifiers 60, 62, 59, 61 are connected to the windings 49, 50, 51, 52 of the step motor 1 respectively.

Figure 3:
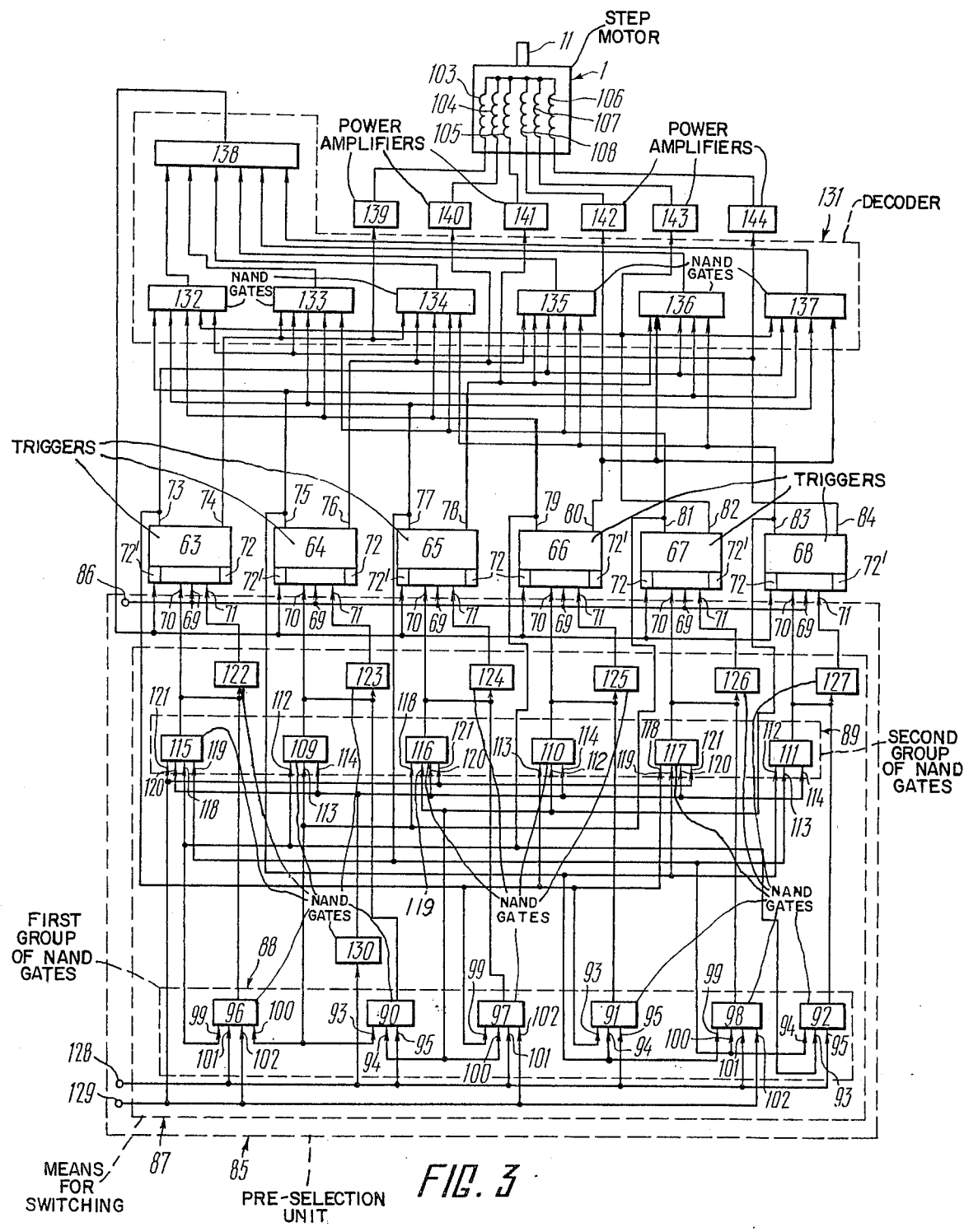
FIG. 3 is a block diagram of a three-phase and a six-phase step motor control system according to the invention.

For changing from one pre-set switching sequence of phases of the step motor 1 to another switching sequence without increasing the hardware and lowering the reliability, there in provided the step motor control system shown in FIG. 3. The system controls a six-phase step motor 1 in accordance with twelve-cycle and six-cycle patterns.

The system comprises six triggers 63, 64, 65, 66, 67, 68. Each of the triggers 63, 64, 65, 66, 67, 68 has a timing input 69, a first data input 70, second data input 71 and first and second, setting inputs 72 and 72'.

The trigger 63 has outputs 73, 74, the trigger 64 has outputs 75, 76, the trigger 65 has outputs 77, 78, the trigger 66 has outputs 79, 80, the trigger 67 has outputs 81, 82, the trigger 68 has outputs 83, 84.

The step motor control system also includes a trigger starting and switching sequence preselection unit 85. The unit 85 effects the setting up of the rotational direction and the amount of rotation of the shaft 11 of the step motor 1.

The trigger starting and switching sequence preselection unit 85 consists of a trigger starting circuit 86 for setting up the amount of rotation of the shaft 11 of the step motor 1 and means 87 for trigger switching sequence preselection and for setting up the rotational direction of the shaft 11 of the step motor 1.

The trigger starting circuit 86 for setting up the amount of rotation of the shaft 11 of the step motor 1 comprises an individual bus receiving a train of clock pulses, the number of clock pulses determining the amount of rotation of the shaft 11 of the step motor 1.

The trigger starting circuit 86 is connected to the timing inputs 69 of the triggers 63, 64, 65, 66, 67, 68.

The means 87 for trigger switching sequence preselection and for setting up the rotational direction of the shaft 11 of the step motor 1 comprises a first group 88 of NAND gates and a second group 89 of NAND gates.

The first group 88 of NAND gates comprises three NAND gates 90, 91, 92 having a first input 93, a second input 94, a third input 95, and an output. The first group 88 also includes three NAND gates 96, 97, 98 having a first input 99, a second input 100, a third input 101, a fourth input 102, and an output.

The first group of NAND gates of the means 87 for trigger switching sequence preselection enables a direct switching sequence of the windings 103, 104, 105, 106, 107, 108 of the step motor 1.

The second group 89 of NAND gates of the means 87 for trigger switching sequence preselection enables a reversed switching sequence of the windings 103, 104, 105, 106, 107, 108 of the step motor 1. The second group 89 includes three NAND gates 109, 110, 111 having a first input 112, a second input 113, a third input 114, and an output, as well as three NAND gates 115, 116, 117 having a first input 118, a second input 119, a third input 120, a fourth input 121, and one output.

The first input 99 of the NAND gate 96 of the first group 88, the first input 93 of the NAND gate 92 of the first group 88, the first input 118 of the NAND gate 115 of the second group 89, and the first input 112 of the NAND gate 109 of the second group 89 are connected to the output 79 of the trigger 66. The second input 100 of the NAND gate 96 of the first group 88, the first input 93 of the NAND gate 90 of the first group 88, the second input 113 of the NAND gate 109 of the second group 89, and the first input 118 of the NAND gate 116 of the second group 89 are connected to the output 81 of the trigger 67.

The second input 94 of the NAND gate 90 of the first group 88, the second input 100 of the NAND gate 97 of the first group 88, the first input 112 of the NAND gate 110 of the second group 89, and the second input 119 of the NAND gate 116 of the second group 89 are connected to the output 83 of the trigger 68.

The first input 99 of the NAND gate 97 of the first group 88, the first input 93 of the NAND gate 91 of the first group 88, the second input 113 of the NAND gate 110 of the second group 89, and the first input 118 of the NAND gate 117 of the second group 89 are connected to the output 73 of the trigger 63. The second input 94 of the NAND gate 91 of the first group 88, the first input 99 of the NAND gate 98 of the first group 88, the first input 112 of the NAND gate 111 of the second group 89, and the second input 119 of the NAND gate 117 are connected to the output 75 of the trigger 64.

The second input 100 of the NAND gate 98 of the first group 88, the second input 94 of the NAND gate 92 of the first group 88, the second input 119 of the NAND gate 115 of the second group 89, and the second input 113 of the NAND gate 111 of the second group 89 are connected to the output 77 of the trigger 65.

The output of the NAND gate 96 of the first group 88 and the output of the NAND gate 115 of the second group 89 are connected directly to the first, data input 70 of the trigger 63 and, via an individual NAND gate 122, to the second data input 71 of the trigger 63.

The output of the NAND gate 90 of the first group 88 and the output of the NAND gate 109 of the second group 89 are connected directly to the first data input 70 of the trigger 64 and, via an individual NAND gate 123 to the second data input 71 of the trigger 64.

The output of the NAND gate 97 of the first group 88 and the output of the NAND gate 116 of the second group 89 are connected directly to the first data input 70 of the trigger 65 and, via an individual NAND gate 124, to the second data input 71 of the trigger 65.

The output of the NAND gate 91 of the first group 88 and the output of the NAND gate 110 of the second group 89 are connected directly to the first data input 70 of the trigger 66 and, via an individual NAND gate 125, to the second data input 71 of the trigger 66.

The output of the NAND gate 98 of the first group 88 and the output of the NAND gate 117 of the second group 89 are connected directly to the first data input 70 of the trigger 67 and, via an individual NAND gate 126, to the second data input 71 of the trigger 67.

The output of the NAND gate 92 of the first group 88 and the output of the NAND gate 111 of the second group 89 are connected directly to the first data input 70 of the trigger 68 and, via an individual NAND gate 127, to the second data input 71 of the trigger 68.

The third inputs 95 of the NAND gates 90, 91, 92 and the third inputs 101 of the NAND gates 96, 97, 98 of the first group 88 are connected to a bus 128 for setting up the rotational direction of the step motor shaft. The fourth inputs 102 of the NAND gates 96, 97, 98 of the first group 88 are connected to a common bus 129 receiving a signal for changing to twelve-cycle or six-cycle switching of the windings of the step motor from a computer (not shown).

The third inputs 114 of the NAND gates 109, 110, 111 and the third inputs 120 of the NAND gates 115, 116, 117 of the second group 89 are connected, via an individual NAND gate 130, to the bus 128 for setting up the rotational direction of the step motor shaft. The fourth inputs 121 of the NAND gates 115, 116, 117 of the second group 89 are connected to the common bus 129.

The above-described connection of the gates is determined by the pre-set rotational direction of the shaft 11 of the step motor 1 and by the pre-set switching type.

The system for controlling the step motor 1 also includes a decoder 131 of the inoperative states of the triggers. The decoder effects the setting of the triggers in one of the operative states determined by a pre-set switching sequence of the windings 103, 104, 105, 106, 107, 108 of the step motor 1. The decoder 131 of the inoperative states of the triggers consists of six NAND gates 132, 133, 134, 135, 136 and 137, each having first, second, third fourth and fifth inputs and one output, and one NAND gate 138 having six inputs and one output.

The output 73 of the trigger 63 is connected to the third input of the NAND gate 135, to the second input of the NAND gate 136, and to the second input of the NAND gate 137. The output 74 of the trigger 63 is connected to the first input of the NAND gate 133, to the first input of the NAND gate 134 and to an input of a power amplifier 139 which is connected to the winding 103 of the step motor 1.

The output 75 of the trigger 64 is connected to the first input of the NAND gate 132, to the third input of the NAND gate 136 and to the third input of the NAND gate 137. The output 76 of the trigger 64 is connected to the second input of the NAND gate 134, to the first input of the NAND gate 135 and to an input of a power amplifier 140 which is connected to the winding 104 of the step motor 1.

The output 77 of the trigger 65 is connected to the second input of the NAND gate 132, to the third input of the NAND gate 133 and to the fourth input of the NAND gate 137. The output 78 of the trigger 65 is connected to the second input of the NAND gate 135, to the first input of the NAND gate 136 and to an input of a power amplifier 141 connected to the winding 105 of the step motor 1.

The output 79 of the trigger 66 is connected to the third input of the NAND gate 132, to the fourth input of the NAND gate 133, and to the third input of the NAND gate 134. The output 80 of the trigger 66 is connected a fifth input of the NAND gate 136, to a fifth input of the NAND gate 137, and to an input of a power amplifier 142 which is connected to the winding 108 of the step motor 1.

The output 81 of the trigger 67 is connected to the fifth input of the NAND gate 133, to the fourth input of the NAND gate 134, and to the fourth input of the NAND gate 135. The output 82 of the trigger 67 is connected to the fourth input of the NAND gate 132, to the first input of the NAND gate 137 and to an input of a power amplifier 143 which is connected to the winding 107 of the step motor 1.

The output 83 of the trigger 68 is connected to the fifth input of the NAND gate 134, to the fifth input of the NAND gate 135 and to the fourth input of the NAND gate 136. The output 84 of the trigger 68 is connected to the fifth input of the NAND gate 132, to the second input of the NAND gate 133 and to an input of a power amplifier 144 which is connected to the winding 106 of the step motor 1.

The outputs of each of the NAND gates 132, 133, 134, 135, 136, 137 are respectively connected to the first, second, third, fourth, fifth and sixth inputs of the NAND gate 138. The output of the NAND gate 138 is connected to the setting inputs 72 of the triggers 66, 67, and 68 and to the setting inputs 72' of the triggers 63, 64 and 65 for setting the triggers 63, 64, 65, 66, 67, 68 in one of the operative states determined by a pre-set switching sequence of the windings 103, 104, 105, 106, 107, 108 of the step motor 1.

In order to reduce hardware and to employ standard NAND gates having three inputs, there is provided another embodiment of the decoder 131 (FIG. 4) of the inoperative states of the triggers. In this embodiment, the decoder 131 of the inoperative states of the triggers includes nine NAND gates 145, 146, 147, 148, 149, 150, 151, 152, 153 having first, second and third inputs and an output, three NAND gates 154, 155, 156 having an input and an output, and an AND gate 157 having first, second, third, fourth, fifth and sixth inputs and an output.

The output 73 of the trigger 63 is connected to the first input of the NAND gate 147 and to the first input of the NAND gate 151. The output 74 of the trigger 63 is connected to the first input of the NAND gate 145.

The output 75 of the trigger 64 is connected to the first input of the NAND gate 146, and to the first input of the NAND gate 153. The output 76 of the trigger 64 is connected to the first input of the NAND gate 149 and to the second input of the NAND gate 152.

The output 77 of the trigger 65 is connected to the second input of the NAND gate 146 and to the second input of the NAND gate 148. The output 78 of the trigger 65 is connected to the second input of the NAND gate 147.

The output 79 of the trigger 66 is connected to the second input of the NAND gate 145 and to the second input of the NAND gate 150. The output 80 of the trigger 66 is connected to the second input of the NAND gate 153 and to the second input of the NAND gate 151.

The output 81 of the trigger 67 is connected to the third input of the NAND gate 145 and to the third input of the NAND gate 152. The output 82 of the trigger 67 is connected to the third input of the NAND gate 146.

The output 83 of the trigger 68 is connected to the second input of the NAND gate 149 and to the third input of the NAND gate 147. The output 84 of the trigger 68 is connected to the third input of the NAND gate 148 and to the third input of the NAND gate 150.

The output of the NAND gate 145 is connected to the input of the NAND gate 154. The output of the NAND gate 146 is connected to the input of the NAND gate 155. The output of the NAND gate 147 is connected to the input of the NAND gate 156. The output of the NAND gate 154 is connected to the first input of the NAND gate 148 and to the third input of the NAND gate 149. The output of the NAND gate 155 is connected to the first input of the NAND gate 150 and the third input of the NAND gate 151. The output of the NAND gate 156 is connected to the first input of the NAND gate 152 and to the third input of the NAND gate 153. The outputs of the NAND gates 148, 149, 150, 151, 152, 153 are respectively connected to the first, second, third, fourth, fifth and sixth inputs of the AND gate 157. The output of the AND gate 157 is connected to the setting inputs 72, 72' of the triggers 63, 64, 65, 66, 67, 68 (FIG. 3).

The three-phase step motor control system functions in the following manner, with the six-cycle sequence pattern.

Upon energization of supply sources of the control system of the step motor 1 (FIG. 1) (supply sources are not shown in the drawings), the triggers 2, 3, 4 are in the following initial states: the trigger 2 is set and the triggers 3 and 4 are reset. Thus a potential corresponding to logical "0" appears at the output 8 of the trigger 2, and a potential corresponding to logical "1" appears at the output 9. A potential corresponding to logical "1" appears at the outputs 8 of the triggers 3 and 4, and potentials corresponding to logical "0" appear at the outputs 9 of these triggers.

The initial state of the triggers 2, 3, 4 in this system for controlling the step motor 1 may be anyone of six states in accordance with the six-cycle switching algorithm of the windings 23, 24, 25 of the step motor 1.

A potential corresponding to logical "1" appears at the bus 19 for setting up the rotation direction of the step motor connected to an output of a computer (not shown) which corresponds to clockwise rotation of the step motor shaft 11. A potential corresponding to logical "1" appears at the second inputs of the NAND gates 16, 17, 18 of the first group 14 and at the inputs of the individual NAND gate 29 connected to the bus 19 for setting up the rotational direction of the step motor shaft.

Therefore, potentials corresponding to logical "1" are applied to the first and second inputs of the NAND gate 18 of the first group 14 from the output 9 of the trigger 2 and from the bus 19 for setting up the rotational direction of the shaft 11 of the step motor 1, respectively.

A potential corresponding to logical "0" appears at the output of the individual NAND gate 29 to be applied to the second inputs of the NAND gates 26, 27, 28 of the second group 15 which are connected to the output of the NAND gate 29 thus disabling other control inputs thereof.

Thus, the following distribution of potentials exists in the means 13 for switching sequence preselection of triggers and the trigger starting and switching sequence preselection unit 10:

Two potentials appear at the inputs of the NAND gate 16 of the first group 14: a potential corresponding to logical "0" appears at the first input which is connected to the output 9 of the trigger 3, and a potential corresponding to logical "1" appears at the second input connected to the bus 19 for setting up the rotational direction of the step motor shaft.

A potential corresponding to logical "1" appears at the input of the individual NAND gate 20, and a potential corresponding to logical "0" appears at the output thereof. Therefore, potentials corresponding to logical "1" and "0" appear at the data inputs 6 and 7, respectively, of the trigger 2.

A potential corresponding to logical "1" appears at the second input of the NAND gate 17 of the girst group 14 which is applied from the bus 19 for setting up the rotational direction of the step motor, and a potential corresponding to logical "0" applied appears at the first input of the NAND gate 17 from the output 9 of trigger 4. Thus a potential corresponding to logical "1" appears at the output of the NAND gate 17 and the input of the individual NAND gate 21.

Potentials corresponding to logical "1" and "0" appear at the inputs 6 and 7, respectively, of the trigger 3.

A potential corresponding to logical "0" appears at the output of the NAND gate 18 of the first group 14, at the output of the NAND gate 28 of the second group 15 connected thereto, and at the input of the individual NAND gate 22.

In the initial state, when a potential corresponding to logical "0" appears at the output 8 of the trigger 2, the power amplifier 32 provides current flowing in the winding 23 of the step motor 1 which is connected to the output 8 of the trigger 2.

At the same time, there is no current in the windings 24 and 25 of the step motor 1 since potentials corresponding to logical "1" are applied to the inputs of the power amplifiers 33 and 34. The first state of the system corresponds to one combination of connection of the windings 23, 24, 25 of the step motor 1, and namely to combination (23).

Therefore, upon setting the step motor control system in the initial state, the trigger 3 is preselected for switching.

Upon the arrival of a pulse ensuring rotation of the shaft 11 of the step motor 1 at one step to the trigger starting circuit 12, the trigger 3 is switched, while the triggers 2 and 4 remain in the same state.

A potential corresponding to logical "0" appears at the output 8 of the trigger 3, and current will flow in the winding 24 of the step motor 1, via the power amplifier 33. This state corresponds to a combination (23, 24) of the six-cycle switching sequence of the windings 23, 24, 25 of the step motor 1.

After the switching of the trigger 3, the NAND gates 16, 17, 18, 20, 21, 26, 27, 28 of means 13 for trigger switching sequence preselection and for setting up the rotational direction of the step motor shaft provide application of respective potentials. As a result, the trigger 2 is preselected for switching. Upon arrival of the next pulse to the trigger starting circuit 12, the trigger 2 is switched, while the triggers 3 and 4 remain in the same state. Thus, potentials corresponding to logical "1" appear at the outputs 8 of the triggers 2 and 4, and a potential corresponding to logical "0" appears at the output 8 of the trigger 3. In this case, current flows in the winding 24 of the step motor 1 which is connected to the output of the power amplifier 33 having at its input a potential corresponding to logical "0."

This corresponds to a combination (24) of the six-cycle switching sequence of the windings 23, 24, 25 of the step motor 1. Further the system operates in the same manner, and the windings 23, 24, 25 of the step motor 1 are switched in the following order:

(23) - (23, 24) - (24) - (24, 25) - (25) - (25, 23) - (23).

Upon the arrival of a noise signal (not shown) or upon starting energization of supply sources (not shown), the triggers 2, 3, 4 may be set in one of the inoperative states with no combination of switching of windings 23, 24, 25 of the step motor 1 within the six-cycle switching sequence corresponding to such a state.

Two such states may occur, when a potential corresponding to logical "0" or to logical "1" concurrently appears at all outputs 8 of the triggers 2, 3, 4. Where a potential corresponding to logical "1" appears at all outputs 8 to the triggers 2, 3, 4, potentials corresponding to logical "1" appear at all three inputs of the NAND gates 31 of the decoder 30 of inoperative states of the triggers connected to the outputs 8 of the triggers 2, 3, 4. A potential corresponding to logical "0" appears at the output of the NAND gate 31. This signal is fed to the input 6 of the trigger 4.

Thus, the triggers 2 and 3 are preselected for switching at the inputs 6 and 7. The trigger 4 is not preselected for switching. Upon the arrival of a pulse to the trigger starting circuit 12, the triggers 2, 3 are switched. This is an operative state corresponding to the combination (23, 24) of connection of the windings 23, 24 of the six-cycle switching sequence of the windings 23, 24, 25 of the step motor 1.

The system is removed from its inoperative state in case the triggers 2, 3, 4 are in the state in which potentials corresponding to logical "0" appear at all outputs 8, in a similar way. Thus, the triggers 2, 3, 4 are set in one of operative states in which the combination of connection of the windings 23, 24, 25 corresponds to (23, 24) combination of the six-cycle switching sequence.

Where it is desired to reverse rotation of the shaft 11 of the step motor 1 (counterclockwise rotation), a potential corresponding to logical "0" is fed to the bus 19 for setting up the rotational direction from a computer. Thus, a potential corresponding to logical "0" is applied to the second inputs of the NAND gates 16, 17, 18 of the first group connected to the bus 19 for setting up the rotational direction of the step motor, and to the input of the individual NAND gate 29. As a result, the first inputs of above-mentioned NAND gates are disabled. A potential corresponding to logical "1" appears at the output of the NAND gate 29.

Upon energization of the supply sources (not shown), a potential corresponding to logical "0" appears at the output 8 of the trigger 2, and potentials corresponding to logical "1" appear at the outputs 8 of the triggers 3, 4. Thus, the power amplifier controls the winding 23 connected thereto in such a manner that current flows therein. The power amplifiers 33 and 34 ensure that there is no current in the windings 24 and 25 of the step motor 1.

This state corresponds to the combination (23) of the six-cycle switching sequence of the windings 23, 24, 25 of the step motor 1.

Potentials corresponding to logical "1" appear at the second inputs of the NAND gates 26, 27, 28 of the second group 15 which are connected to the output of the individual NAND gate 29.

A potential corresponding to logical "0" appears at the first input of the NAND gate 26 of the second group 15 which is connected to the output 9 of the trigger 4, and a potential corresponding to logical "1" appears at the output of this gate.

This signal is fed to the input 6 of the trigger 2 and to the input of the individual NAND gate 20.

A potential corresponding to logical "1" appears at the second input of the NAND gate 27 of the first group 15 connected to the output 9 of the trigger 2, and a potential corresponding to logical "0" appears at the output of the NAND gate 27 to be applied to the input 6 of the trigger 3 and to the input of the individual NAND gate 21.

A potential corresponding to logical "0" appears at the first input of the NAND gate 28 of the second group 15 connected to the output 9 of the trigger 3, and a potential corresponding to logical "1" appears at the output of the NAND gate 28 and is applied to the data input 6 of the trigger 4 and to the input of the individual NAND gate 22.

Thus, the trigger 4 becomes preselected for switching. Upon the arrival of a pulse to the trigger starting circuit 12, the trigger 4 is switched, and a potential corresponding to logical "0" appears at the output 8 thereof. The state of the triggers 2 and 3 remains unchanged. The power amplifier 34 feeds current to the winding 25 of the step motor 1.

This state of the system corresponds to one of combinations of connection of the windings 23, 24, 25 of the step motor of the six-cycle switching sequence, and namely, to the combination (23, 25).

Further, means 13 for trigger switching sequence preselection and for setting up the rotational direction of the step motor shaft provides for setting potentials at the inputs of the triggers 2, 3, 4 in such a manner that the trigger 2 becomes preselected for switching. Upon the arrival of a pulse to the trigger starting circuit 12, the trigger 2 is switched, and a potential corresponding to logical "1" appears at the output 8 thereof. With such state of the triggers 2, 3, 4, current flows only in the winding 25 which corresponds to the operative combination of connection of the windings 23, 24, 25 of the six-cycle switching sequence, and namely, to the combination (25).

Subsequently, preselection of the triggers 2, 3, 4 for switching, switching of the triggers 2, 3, 4 and energization of the windings 23, 24, 25 occur in the similar manner. The following sequence of switching of the windings 23, 24, 25 of the step motor 1 is performed:

(23) - (23, 25) - (25) - (25, 24) - (24) - (24,23) - (23) . .

The four-phase step motor control system with four-cycle switching sequence functions in the following manner.

Upon energization of supply sources (not shown), the trigger 36 is set (FIG. 2) and the trigger 35 is reset. The initial state may be anyone of four states in accordance with the four-cycle algorithm of switching of the windings 49, 50, 51, 52 of the step motor 1.

Thus, potentials corresponding to logical "1" appear at the output 40 of the trigger 35 and at the output 41 of the trigger 36, and potentials corresponding to logical "0" appear at the output 41 of the trigger 35 and at the output 40 of the trigger 36. The power amplifiers 59 and 62 connected to the windings 51 and 50 of the step motor 1 provide current supply to these windings. This state corresponds to an operative combination of connection of the windings 49, 50, 51, 52 of the step motor 1, and namely to the combination (50, 51).

A potential corresponding to logical "1" applied from the output of a computer (not shown) appears at the bus 58 for setting up the rotational direction of the step motor which corresponds to the clockwise rotational direction of the shaft 11 of the step motor 1.

A potential corresponding to logical "1" appears at the second inputs of the NAND gates 47 and 48 of the first group 45 and at the input of the individual NAND gate 57 which are connected to the bus 58 for setting up the rotational direction of the step motor shaft. A potential corresponding to logical "0" appears at the output of the individual NAND gate 57 and at the second inputs of the NAND gates 53, 54 of the second group 46 connected thereto thus disabling the first inputs of the NAND gates 53, 54. A potential corresponding to logical "1" is applied to the first input of the NAND gate 47 of the first group 45 from the output 41 of the trigger 36, and a potential corresponding to logical "1" is applied to the first input of the NAND gate 48 from the output 40 of the trigger 35. A potential corresponding to logical "0" appears at the output of the NAND gate 47 of the first group 45, as well as at the input 38 of the trigger 35 and at the input of the individual NAND gate 55 which are connected thereto.

A potential corresponding to logical "0" appears at the output of the NAND gate 48 of the first group 45, as well as at the input 38 of the trigger 36 and at the input of the individual NAND gate 56 which are connected thereto. Thus, the trigger 36 becomes preselected for switching.

Upon the arrival of a pulse to the trigger starting circuit 43, the trigger 36 is switched. Thus, a potential corresponding to logical "1" appears at the output 40 thereof, and a potential corresponding to logical "0" appears at the output 41 thereof.

The power amplifier 61 provides current supply to the winding 52 of the step motor 1 which corresponds to the next combination of connection of the windings 49, 50, 51, 52 of the four-cycle sequence, and namely to the combination (50, 52). After the switching of the trigger 36, a redistribution of potentials occurs in the means 44 for trigger switching sequence preselection in such a manner that the trigger 35 becomes preselected for switching. Thus, upon the arrival of the next pulse to the trigger starting circuit 43, the trigger 35 is switched. A potential corresponding to logical "0" appears at the output 40 thereof, and current flows in the windings 49 and 52 which corresponds to an operative combination of four-cycle switching sequence of the windings 49, 50, 51, 52, and namely to the combination (49, 52).

Therefore, the direct switching sequence of the windings 49, 50, 51, 52 of the step motor 1 is performed:

(50, 51) - (50, 52) - (49, 52) - (49, 51) - (50, 51) . . .

When it is required to reverse the rotation of the shaft 11 of the step motor 1 (counterclockwise), a potential corresponding to logical "0" is fed from the output of the computer (not shown) to the bus 58 for setting up the rotational direction of the step motor shaft.

At the initial state, when a potential corresponding to logical "0" appears at the output 41 of the trigger 35 and at the output 40 of the trigger 36, and a potential corresponding to logical "1" appears at the output 40 of the trigger 35 and at the output 41 of the trigger 36, current flows in the windings 50, 51 which corresponds to the combination (50, 51) of connection of the windings.

A potential corresponding to logical "0" appears at the input of the individual NAND gate 57 connected to the bus 58 for setting up the rotational direction of the step motor shaft and at the second inputs of the NAND gates 47 and 48 of the first group 45 which are connected to the input of the individual NAND gate 57.

The first inputs of the NAND gates 47 and 48 of the first group 45 are thus disabled. A potential corresponding to logical "1" appears at the output of the individual NAND gate 57 and at the second inputs of the NAND gates 53, 54 of the second group 46 which are connected to the output thereof.

A potential corresponding to logical "0" applied from the output 40 of the trigger 36 appears at the first input of the NAND gate 53 of the second group 46. A potential corresponding to logical "0" applied from the output 41 of the trigger 35 appears at the first input of the NAND gate 54 of the second group 46.

A potential corresponding to logical "1" appears at the output of the NAND gate 53, at the input of the individual NAND gate 55 and at the input 38 of the trigger 35 which are connected to one another.

A potential corresponding to logical "1" appears at the output of the NAND gate 54 of the second group 46, at the input of the individual NAND gate 56 and at the input 38 of the trigger 36 which are connected to one another.

Thus the trigger 35 is prepared for switching.

Upon the arival of a pulse to the trigger starting circuit 43, the trigger 35 is switched, and a potential corresponding to logical "0" appears at the output 40 thereof. The power amplifier 60 provides current supply to the winding 49 of the step motor 1.

This state corresponds to an operative combination of connection of the windings 49, 50, 51 52 of the four-cycle switching sequence of the windings, and namely to the combination (49, 51).

Subsequently, the means 44 for trigger switching sequence preselection and for setting up the rotational direction of the step motor shaft effects a redistribution of the potentials in such a manner that the trigger 36 is preselected for switching. Upon the arrival of a pulse to the trigger starting circuit 43, the trigger 36 is switched, and a potential corresponding to logical "0" appears at the output 41 thereof. Thus, the power amplifier 61 is controlled to supply current to the winding 52 of the step motor 1. This state corresponds to an operative combination of connection of the windings 49, 50, 51, 52 of the step motor 1 of the four-cycle switching sequence, and namely to the combination (49, 52).

Thus, the reversed four-cycle switching sequence of the windings 49, 50, 51, 52 of the step motor 1 is performed:

(50,51) - (49,51) - (49,52) - (50,52) - (50,51) . . .

The six-phase step motor control system functions in the following manner, with the six- and twelve-cycle switching sequence.

Upon energization of supply sources (not shown), the initial state of the triggers 63, 64, 65, 66, 67, 68 is such (FIG. 3) that a potential corresponding to logical "1" appears at the outputs 73, 75, 77 of the triggers 63, 64, 65, and a potential corresponding to logical "0" appears at the outputs 74, 76, 78 of the same triggers. A potential corresponding to logical "0" appears at the outputs 79, 81, 83 of the triggers 66, 67, 68, and a potential corresponding to logical "1" appears at the outputs 80, 82, 84 of the same triggers.

At the moment of energization of supply sources the initial state may be of any kind (not shown), and this is of no importance for consideration of the potential distribution within the circuit.

With the resultant state of the triggers, the power amplifiers 142, 143, 144 connected to the outputs 80, 82, 84 of the triggers 66, 67, 68 provide current supply to the windings 108, 107, 106. This corresponds to a first operative combination of connection of the windings of the twelve-cycle switching sequence of the windings 103, 104, 105, 106, 107, 108 of the step motor 1, and namely to the combination 106, 107, 108.

A potential corresponding to logical "1" applied from the output of a computer (not shown) appears at the bus 128 for setting up the rotational direction of the shaft of the step motor 1. This corresponds to the clockwise rotation of the shaft 11 of the step motor 1. A potential corresponding to logical "1" appears at the inputs 95 of the NAND gates 90, 91, 92 of the first group 88, at the inputs 101 of the NAND gates 96, 97, 98 of the first group 88 and at the input of the individual NAND gate 130 which are connected to the bus 128 for setting up the rotational direction of the step motor shaft.

A potential corresponding to logical "0" appears at the output of the individual NAND gate 130 as well as at the inputs 114 of the NAND gates 109, 110, 111 of the second group, and inputs 120 of the NAND gates 115, 116, 117 of the second group 89 connected to the output of the individual NAND gate 130. As a result, the remaining inputs of the above-mentioned NAND gates are disabled.

A potential corresponding to logical "1" appears at the inputs 102 of the NAND gates 96, 97, 98 connected to the common bus 129 receiving a pulse from the output of the computer (not shown) for changing from the twelve-cycle switching sequence to the six-cycle switching sequence of the windings 103, 104, 105, 106, 107, 108 of the step motor 1.

A signal corresponding to logical "0" is fed to the input 99 of the NAND gate 96 of the first group 88 from the output 79 of the trigger 66, and a potential corresponding to logical "0" is applied to the input 100 of the NAND gate 96 from the output 81 of the trigger 67.

A potential corresponding to logical "0" is applied to the input 93 of the NAND gate 90 of the first group 88 from the output 81 of the trigger 67, and a potential corresponding to logical "0" is applied to the input 94 of the NAND gate 90 from the output 83 of the trigger 68.

A potential corresponding to logical "1" is applied to the input 99 of the NAND gate 97 of the first group 88 from the output 73 of the trigger 63, and a potential corresponding to logical "0" is applied to the input 100 of the NAND gate 97 from the output 83 of the trigger 68.

A potential corresponding to logical "1" is applied to the input 93 of the NAND gate 91 of the first group 88 from the output 73 of the trigger 63, and a potential corresponding to logical "1" is applied to the input 94 of the NAND gate 91 from the output 75 of the trigger 64.

A potential corresponding to logical "1" is applied to the input 100 of the NAND gate 98 from the output 77 of the trigger 65, and a potential corresponding to logical "1" is applied to the input 99 of the NAND gate 98 from the output 75 of the trigger 64.

A potential corresponding to logical "0" is applied to the input 93 of the NAND gate 92 of the first group 88 from the output 79 of the trigger 66, and a potential corresponding to logical "1" is applied to the input 94 of the NAND gate 92 from the output 77 of the trigger 65.

A potential corresponding to logical "1" appears at the output of the NAND gate 96 of the first group 88, at the output of the NAND gate 115 of the second group 89, at the input of the individual NAND gate 122 and at the input 70 of the trigger 63 which are connected thereto.

A potential corresponding to logical "1" appears at the output of the NAND gate 90 of the first group 88, at the output of the NAND gate 109 of the second group 89, at the input of the individual NAND gate 123 and at the input 70 of the trigger 64 which are connected thereto.

A potential corresponding to logical "1" appears at the output of the NAND gate 97 of the first group 88, at the output of the NAND gate 116 of the second group 89, at the input of the individual NAND gate 124 and at the input 70 of the trigger 65 which are connected thereto.

A potential corresponding to logical "0" appears at the output of the NAND gate 91 of the first group 88 group, at the input of the individual NAND gate 125 and at the input 70 of the trigger 66 which are connected thereto.

A potential corresponding to logical "0" appears at the output of the NAND gate 98 of the first group 88 group, at the input of the individual NAND gate 126 and at the input 70 of the trigger 67 which are connected thereto.

A potential corresponding to logical "1" appears at the output of the NAND gate 92 of the first group 88, at the output of the NAND gate 111 of the second group 89, at the input of the individual NAND gate 127 and at the input 70 of the trigger 68 which are connected thereto.

Thus, the trigger 68 becomes preselected for switching and upon the arrival of a pulse to the trigger starting circuit 86, the trigger 68 is switched. A potential corresponding to logical "1" appears at the output 83 thereof, and a potential corresponding to logical "0" appears at the output 84 thereof.

Thus, the power amplifier 144 which is controlled by the output 84 of the trigger 68 connected thereto deenergizes the winding 106 of the step motor 1 to interrupt the flow of current therein. This corresponds to an operative combination of connection of the windings 103, 104, 105, 106, 107, 108 of the step motor 1 of the twelve-cycle switching sequence, and namely to the combination (107, 108).

After the switching of the trigger 68, the means 87 for trigger switching sequence preselection and for setting up the rotational direction of the step motor shaft performs a redistribution of the potentials in such a manner that the trigger 65 becomes preselected for switching.

Upon the arrival of a pulse to the trigger starting circuit, the trigger 65 is switched, and a potential corresponding to logical "0" appears at the output 77 thereof, and a potential corresponding to logical "1" appears at the output 78 thereof. Thus, the power amplifier 141 which is controlled by the signal fed from the output 78 of the trigger 65 provides current supply to the winding 105 of the step motor 1. This state corresponds to an operative combination of connection of the windings 103, 104 105, 106, 107, 108 of the step motor 1 of the twelve-cycle switching sequence, and namely to the combination (105, 107, 108).

Subsequently, the triggers 63, 64, 65, 66, 67, 68 are preselected for switching, the triggers 63, 64, 65, 66, 67, 68 are switched, and the windings 103, 104, 105, 106, 107, 108 of the step motor 1 are energized in the similar manner so as to perform the following switching sequence of the windings 103, 104, 105, 106, 107, 108 of the stem motor 1:

(106, 107, 108) - (107, 108) - (105, 107, 108) - (105, 108) - (104, 105, 108) - (104, 105) - (103, 104, 105) - (103, 104) - (103, 104, 106) - (103-106) - (103, 106, 107) - (106, 107) - (106, 107, 108) . . .

Where it is required to reverse the rotation of the shaft 11 of the step motor 1 (counterclockwise rotation), a potential corresponding to logical "0" is applied from the output of the computer (not shown) to the bus 128 for setting the rotational direction of the step motor shaft.

Upon energization of supply sources (not shown) of the step motor control system, the triggers 63, 64, 65, 66, 67, 68 are set in a state at which potentials corresponding to logical "1" appear at the outputs 73, 75, 77, 80, 82, 84 of the respective triggers 63, 64, 65, 66, 67, 68, and potentials corresponding to logical "0" appear at the outputs 74, 76, 78, 79, 81, 83 of the respective triggers 63, 64, 65, 66, 67, 68.

Thus, the power amplifiers 142, 143, 144 are controlled by the signals fed from the outputs 80, 82, 84 of the triggers 66, 67, 68 connected thereto so as to provide current supply to the windings 108, 107, 106 of the step motor 1. This corresponds to an operative combination of the windings 103, 104, 105, 106, 107, 108 of the step motor 1 of the twelve-cycle switching sequence, and namely to the combination (106, 107, 108).

A potential corresponding to logical "0" appears at the input of the individual NAND gate 130 which is connected to the bus 128 for setting up the rotational direction of the step motor shaft, at the inputs 95 of the NAND gates 90, 91, 92 of the first group 88 and at the inputs 101 of the NAND gates, 96, 97, 98 of the first group 88. Thus, the remining inputs of the above-mentioned NAND gates 90, 91, 92, 96, 97, 98 of the first group 88 are disabled.

A potential corresponding to logical "1" appears at the output of the individual NAND gate 130, as well as at the inputs 114 of the NAND gates 109, 110, 111 of the second group 89, and at the inputs 120 of the NAND gates 115, 116, 117 of the second group 89 which are connected thereto.

A potential corresponding to logical "1" appears at the inputs 121 of the NAND gates 115, 116, 117 of the second group 89. This potential is applied from the common bus 129 which received a pulse from the computer output (not shown) for changing from the twelve-cycle switching sequence to the six-cycle switching sequence of the windings 103, 104, 105, 106, 107, 108 of the step motor 1.

A potential corresponding to logical "0" is applied to the input 118 of the NAND gate 115 of the second group 89 from the output 79 of the trigger 66, and a potential corresponding to logical "1" is applied to the output 119 thereof from the output 77 of the trigger 65.

A potential corresponding to logical "0" is applied to the input 113 of the NAND gate 109 of the second group 89 from the output 81 of the trigger 67, and a potential corresponding to logical "0" is applied to the input 112 thereof from the output 79 of the trigger 66.

A potential corresponding to logical "0" is applied to the input 119 of the NAND gate 116 of the second group 89 from the output 83 of the trigger 68, and a potential corresponding to logical "0" is applied to the input 118 thereof from the output 81 of the trigger 67.

A potential corresponding to logical "0" is applied to the input 112 of the NAND gate 110 of the second group 89 from the output 83 of the trigger 68, and a potential corresponding to logical "1" is applied to the input 113 thereof from the output 73 of the trigger 63.

A potential corresponding to logical "1" is applied to the input 119 of the NAND gate 117 of the second group 89 from the output 75 of the trigger 64, and a potential corresponding to logical "1" is applied to the input 118 thereof from the output 73 of the trigger 63.

A potential corresponding to logical "1" is applied to the input 113 of the NAND gate 111 of the second group 89 from the output 77 of the trigger 65, and a potential corresponding to logical "1" is applied to the input 112 thereof from the output 75 of the trigger 64.

With the above-described distribution of potentials at the inputs of the above-mentioned NAND gates of the first and second groups 88 and 89, the following distribution of potentials obtains at the outputs of the NAND gates and at the trigger inputs. A potential corresponding to logical "1" appears at the output of the NAND gate 115 of the second group 89, at the input of the individual NAND gate 122, at the output of the NAND gate 96 of the first group 88, and at the input 70 of the trigger 63 which are connected thereto.

A potential corresponding to logical "1" appears at the output of the NAND gate 109 of the second group 89, at the output of the NAND gate 90 of the first group 88, at the input of the individual NAND gate 123 and at the input 70 of the trigger 64 which are connected thereto.

A potential corresponding to logical "1" appears at the output of the NAND gate 116 of the second group 89, at the output of the NAND gate 97 of the first group 88, at the input of the individual NAND gate 124 and at the input 70 of the trigger 65 which are connected thereto.

A potential corresponding to logical "1" appears at the output of the NAND gate 110 of the second group 89 at the output of the NAND gate 91 of the first group 88, at the input of the individual NAND gate 125 and at the input 70 of the trigger 66 which are connected thereto.

A potential corresponding to logical "0" appears at the output of the NAND gate 117 of the second group 89 well as at the output of the NAND gate 98, the individual NAND gate 126 and at the input 70 of the trigger 67 which are connected thereto.

A potential corresponding to logical "0" appears at the output of the NAND gate 111 of the second group 89, at the input of the individual NAND gate 127 and at the input 70 of the trigger 68 which are connected thereto.

Thus, the trigger 66 becomes preselected for switching. Upon the arrival of a pulse to the trigger starting circuit 86, the trigger 66 is switched, and a potential corresponding to logical "1" appears at the output 79 thereof, and a potential corresponding to logical "0" appears at the output 80 thereof.

The power amplifier 142 which has its input connected to the output 80 of the trigger 66 disconnects the winding 108 of the step motor 1 so that current flow therein is interrupted. Thus, the state of the triggers 63, 64, 65, 66, 67, 68 corresponds to an operative combination of connection of the windings 103, 104, 105, 106, 107, 108 of the step motor 1 of the twelve-cycle switching sequence, and namely to the combination (106, 107).

After the switching of the trigger 66, the means 87 for trigger switching sequence preselection and for setting up the rotational direction of the step motor shaft sets up such a distribution of the potentials at the inputs of the triggers 63, 64, 65, 66, 67, 68 that the trigger 63 becomes preselected for switching. Upon the arrival of the next pulse to the trigger starting circuit 86, the trigger 63 is switched, and a potential corresponding to logical "0" appears at the output 73 thereof. A logical "1" signal is fed to the power amplifier 139 connected to the trigger 63 to supply current to the winding 103. This state of the control system corresponds to an operative combination of connection of the windings 103, 104, 105, 106, 107, 108 of the step motor 1 of the twelve-cycle switching sequence, and namely to the combination (103, 106, 107).

Subsequent preselection for switching of the triggers 63, 64, 65, 66, 67, 68, and energization of the windings 103, 104, 105, 106, 107, 108 of the step motor 1 are performed in the similar manner. Thus, the following switching sequence of the windings 103, 104, 105, 106, 107, 108 of the step motor 1 is performed:

(106, 107, 108) - (106, 107) - (103, 107, 108) - (103-106)- (103, 104, 106) - (103, 104) - (103, 104, 105) - (104, 105) - (104, 105, 108) - (105, 108) - (105, 107, 108) - (107, 108) - (106, 107, 108) . . .

Where it is desired to perform a six-cycle switching sequence of the windings 103, 104, 105 106, 107, 108 of the step motor 1, a potential corresponding to logical "0" is applied to the common bus 129 from the computer output (not shown). A potential corresponding to logical "0" appears at the inputs 102 of the NAND gates 96, 97, 98 of the first group 88 and at the inputs 121 of the NAND gates 115, 116, 117 of the second group 89 which are connected to the common bus 129. This signal disables the remaining inputs of the above-mentioned NAND gates. It is noted that with the clock-wise rotations of the shaft 11 of the step motor 1 the NAND gates 90, 91, 92 of the first group are active in the preselection of the switching sequence of the triggers 64, 66, 68, and with the counterclockwise rotation of the shaft 11 of the step motor 1 the NAND gates 109, 110, 111 are active in the preselection of the switching sequence of the triggers 64, 66, 68. Thus, the six-cycle switching sequence of the windings 104, 106, 108 is performed in the direct and reverse orders similarly to the above-described switching sequence for a six-cycle pattern control of the three-phase step motor.

Upon the arrival of a noise signal via supply circuits (not shown), the triggers 63, 64, 65, 66, 67, 68 are set in a state which corresponds to an inoperative combination of connection of the windings 103, 104, 105, 106, 107, 108 of the step motor 1, and, a potential corresponding to logical "1" appears at the outputs 73, 75, 77, 79, 82, 84 of the triggers 63, 64, 65, 66, 67, 68, respectively, and a potential corresponding to logical "0" appears at the outputs 74, 76, 78, 80, 81, 83 of the triggers 63, 64, 65, 66, 67, 68, respectively.

Upon the arrival of the noise signal via supply circuits (not shown), the triggers may be set in any other inoperative state. There may be $(2^6-12)$ such states since $2^6$ combinations of connections of triggers 63, 64, 65, 66, 67, 68 may occur, among which 12 states are operative ones. Therefore, the decoder 131 of inoperative states of the triggers eliminates $(2^6-12)$ inoperative states of the triggers 63, 64, 65, 66, 67, 68.

In the case herein described, current does not flow in the windings 103, 104, 105, 106, 107, 108 of the step motor 1 so that an inoperative combination of connection of these windings occurs.

Thus, the following distribution of potentials occurs in the decoder 131 of inooperative states.

A potential corresponding to logical "1" appears at the inputs of the NAND gates 135, 136, 137 connected to the output 73 of the trigger 63. At potential corresponding to logical "0" appears at the inputs of the NAND gates 133, 134 connected to the output 74 of the trigger 63. A potential corresponding to logical "1" appears at the inputs of the NAND gates 132, 136, 137 connected to the output 75 of the trigger 64. A potential corresponding to logical "0" appears at the inputs of the NAND gates 134, 135 connected to the output 76 of the trigger 64. At potential corresponding to logical "1" appears at the inputs of the NAND gates 132, 133, 137 connected to the output 77 of the trigger 65. A potential corresponding to logical "0" appears at the inputs of the NAND gates 135, 136 connected to the output 78 of the trigger 65. A potential corresponding to logical "1" appears at the inputs of the NAND gates 132, 133, 134 connected to the output 79 of the trigger 66. A potential corresponding to logical "0" appears at the inputs of the NAND gates 136, 137 connected to the output 80 of the trigger 66. A potential corresponding to logical "0" appears at the inputs of the NAND gates 133, 134, 135 connected to the output 81 of the trigger 67. A potential corresponding to logical "1" appears at the inputs of the NAND gates 132, 137 connected to the output 82 of the trigger 67. A potential corresponding to logical "0" appears at the inputs of NAND gates 134, 135, 136 connected to the output 83 of the trigger 68. A potential corresponding to logical "1" appears at the inputs of the NAND gates 132, 133 connected to the output 84 of the trigger 68.

Thus, potentials corresponding to logical "1" appear at all inputs of the NAND gate 132 and a potential corresponding to logical "0" appears at the output thereof. Potentials corresponding to logical "1" appear at the outputs of the NAND gates 133, 134, 135, 136, 137. Thus, a potential corresponding to logical "0" appears at the input of the NAND gate 138 connected to the output of the NAND gate 132, and a potential corresponding to logical "0" appears at the output of the NAND gate 138.

A potential corresponding to logical "0" which sets the triggers 63, 64, 65, 66, 67, 68 in one of the operative states is applied to the setting inputs 72' of the triggers 63, 64, 65 and to the setting inputs 72 of the triggers 66, 67, 68 from the output of the NAND gate 138 of the decoder 131 of inoperative states. A potential corresponding to logical "1" appears at the outputs 73, 75, 77 of the triggers 63, 64, 65, and a potential corresponding to logical "0" appears at the outputs 74, 76, 78 of the same triggers. A potential corresponding to logical "0" appears at the outputs 79, 81, 83 of the triggers 66, 67, 68, and a potential corresponding to logical "1" appears at the outputs 80, 82, 84 of the same triggers. The power amplifiers 142, 143, 144 connected to the outputs 80, 82, 84 of the triggers 66, 67, 68 supply current to the windings 108, 107, 106 which corresponds to an operative combination of the windings 103, 104, 105, 106, 107, 108 of the step motor 1 of the twelve-cycle switching sequence. The triggers 63, 64, 65, 66, 67, 68 may be set in any other state corresponding to a pre-set combination of connection of the windings 103, 104, 105, 106, 107, 108 of the step motor 1 by respectively connecting the inputs 72, 72' to the output of the NAND gate 138 of the decoder 131 of inoperative states of the triggers.

Figure 4:
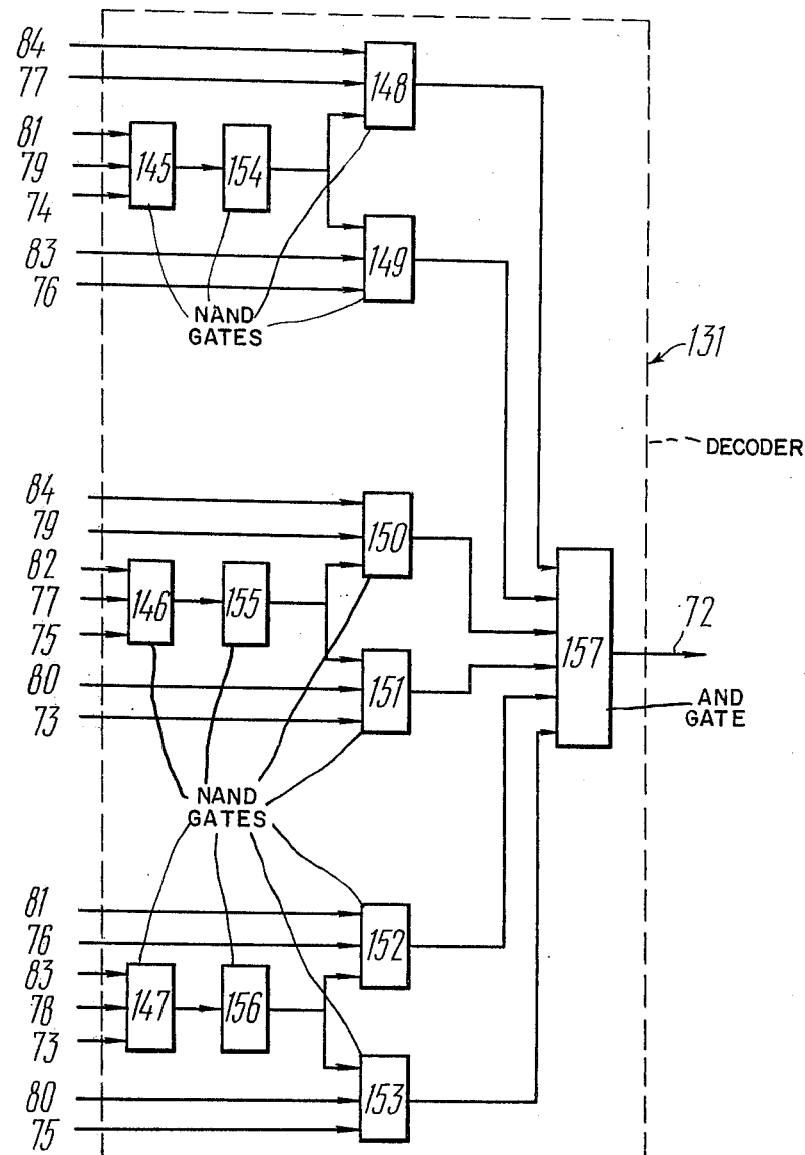
FIG. 4 is a block diagram of one embodiment of the decoder of inoperative states of the triggers of the step motor control system according to the invention.

In order to reduce hardware in the decoder 131 of inoperative states, the decoder 131 shown in FIG. 4 is used.

In case one of the inoperative states of the triggers 63, 64, 65, 66, 67, 68 described above occurs, the following distribution of potentials in the decoder 131 of inoperative states of the triggers (FIG. 4) takes place.

A potential corresponding to logical "1" is applied to the inputs of the NAND gates 146 and 148 connected to the output 77 of the trigger 65. A potential corresponding to logical "1" is applied to the inputs of the NAND gates 148 and 150 connected to the output 84 of the trigger 68. A potential corresponding to logical "1" is applied to the input of the NAND gate 145 connected to the output 74 of the trigger 63. A potential corresponding to logical "0" is applied to the inputs of the NAND gates 145, 152 connected to the output 81 of the trigger 67. A potential corresponding to logical "0" is applied to the inputs of the NAND gates 149, 147 connected to the output 83 of the trigger 68. A potential corresponding to logical "0" is applied to the inputs of the NAND gates 149, 152 connected to the output 76 of the trigger 64. A potential corresponding to logical "1" is applied to the inputs of the NAND gates 146, 153 connected to the output 75 of the trigger 64. A potential corresponding to logical "1" is applied to the input of the NAND gate 146 connected to the output 82 of the trigger 67. A potential corresponding to logical "0" is applied to the inputs of the NAND gates 151 and 147 connected to the output 73 of the trigger 63. A potential corresponding to logical "0" is applied to the inputs of the NAND gate 147 connected to the output 78 of the trigger 65. A potential corresponding to logical "0" is applied to the NAND gate 145 connected to the output 79 of the trigger 66. A potential corresponding to logical "1" is applied to the NAND gates 151, 153 connected to the output 80 of the trigger 66.

Then, potentials corresponding to logical "1" appear at the outputs of the NAND gates 145 and 147 and a potential corresponding to logical "0" appears at the output of the NAND gate 146.

Potentials corresponding to logical "0" appear at the outputs of the NAND gates 154, 156, and a potential corresponding to logical "1" appears at the output of the NAND gate 155.

Therefore, potentials corresponding to logical "1" appear at the outputs of the NAND gates 148, 149, 151, 152, and 153 and a potential corresponding to logical "0" appears at the output of the NAND gate 150.

As a result, a potential corresponding to logical "0" appears at the input of the NAND gate 157 connected to the output of the NAND gate 150, and a potential corresponding to logical "0" appears at the output of the AND gate 157. This signal is fed to the setting inputs 72 (FIG. 3) of the triggers 63, 64, 65 and to the setting inputs 72' of the triggers 66, 67, 68 to set all triggers 63, 64, 65, 66, 67, 68 in one of the operative states.

A potential corresponding to logical "1" appears at the outputs 73, 75, 77 of the triggers 63, 64, 65, and a potential corresponding to logical "0" appears at the outputs 74, 76, 78 of the same triggers. A potential corresponding to logical "0" appears at the outputs 79, 81, 83 of the triggers 66, 67, 68, and a potential corresponding to logical "1" appears at the outputs 80, 82, 84 of the same triggers. This corresponds to an operative combination of connection of the windings 103, 104, 105, 106, 107, 108 of the step motor 1 of the twelve-cycle switching sequence of windings of the step motor.

What is claimed is:

1. A step motor control system for controlling a step motor having a shaft and a plurality of windings, comprising:
 power amplifiers having an input and an output, there being the same number of power amplifiers as there are windings, the output of each power amplifier being connected to a respective winding of said step motor; triggers having a timing input, a first data input, a second data input, a first output and a second output, there being the same number of triggers as there are windings, the first output of each trigger being connected to the input of a respective power amplifier; a trigger starting and switching sequence preselection unit for setting up the rotational direction and the amount of rotation of said step motor shaft having a starting circuit and means for switching; said starting circuit sets up the amount of rotation of said step motor shaft in said unit, said starting circuit having an individual bus which is connected to the timing input of each of said triggers; said means for switching switches the sequence preselection of said triggers for setting up the rotational direction of said step motor shaft in said unit; a bus for setting up the rotational direction of said step motor shaft of said means for switching; a first group of NAND gates of said means for switching said NAND gates of said first group of NAND gates effecting a direct sequence of switching of said windings of said step motor, said first group having the same number of NAND gates as there are triggers, said NAND gates of said first group each having a first input, a second input and an output, the first input of each NAND gate being connected to the first output of one of the triggers, the second input being connected to said bus for setting up the rotational direction of said step motor shaft, and the output being connected to the second data input of one of the remaining triggers; a second group of NAND gates of said means for switching for effecting a reverse sequence of switching of said windings of said step motor, said second group having the same number of NAND gates as there are triggers, said NAND gates of said second group having a first input, a second input and an output, the first input of each NAND gate being connected to the first output of one of said triggers, the output being connected to the second data input of one of the remaining triggers; a first individual NAND gate of said means for switching having an input and an output, the input being connected to said bus for setting up the rotational direction of said step motor shaft, and the output being connected to the second input of each of said NAND gates of said second group of NAND gates; a set of individual NAND gates of said means for switching, said set having the same number of NAND gates as there are triggers, each individual NAND gate of said set having an input and an output, the input of each individual NAND gate being connected to the output of one of the NAND gates of said first group of NAND gates and to the output of one of the NAND gates of said second group of the NAND gates and the output of each individual NAND gate being connected to the second data input of said trigger having the first data input thereof directly connected to said NAND gates of said first group of NAND gates and of said second group of NAND gates connected to the respective individual NAND gates; a decoder of inoperative states of said triggers having inputs and an output, its inputs being connected to the first outputs of said triggers, and its output being connected to the first data input of one of said triggers.

2. A step motor control arrangement of a step motor having a shaft and six windings, for a twelve-cycle and a six-cycle switching sequence of said step motor windings comprising:

six power amplifiers having an input and an output, the output of each power amplifier being connected to one of said windings of the step motor;

six triggers having a timing input, a first data input, a second data input, a first setting input, a second setting input, a first output and a second output, the second output of each trigger being connected to the input of one of said power amplifiers;

a trigger starting and switching sequence preselection unit for setting up the rotational direction and the amount of rotation of said step motor shaft having a circuit for starting and means for switching; said circuit for starting starts said six triggers, sets up the amount of rotation of said step motor shaft, and has an individual bus connected to said timing input of each of said triggers; said means for switching switches the sequence preselection of said six triggers and sets up the rotational direction of said step motor shaft; a bus for setting up the rotational direction of said step motor shaft of said means for switching; a common bus receiving a control signal selecting a step motor control system of a twelve-cycle or a six cycle switching sequence of said step motor windings of said means; a first group of NAND gates of said means for switching enabling a direct sequence of switching of said step motor windings and having six NAND gates having a first input, a second input, a third input and an output, the first input of each NAND gate being connected to the first output of one of said six triggers, the third input of each NAND gate being connected to said bus for setting up the rotational direction of said step motor shaft, said second input of each NAND gate being connected to said first output of another of said triggers, and the output of each NAND gate being connected to the first data input of one of the remaining five triggers, every second of said six NAND gates of said first group having a fourth input connected to said common bus; a second group of NAND gates of said means for switching for enabling a reverse sequence of switching of said step motor windings and having six NAND gates having a first input, a second input, a third input and an output, the first input of each NAND gate being connected to the first output of one of said triggers, the second input being connected to the first output of another of said triggers, the output being connected to the first data input of one of said remaining five triggers, every second of said six NAND gates of said second group having a fourth input connected to said common bus; a first individual NAND gate of said means for switching having an input and an output, the input being connected to said bus for setting up the rotational direction of said step motor shaft, and the output being connected to the third input of each of said NAND gates of said second group of NAND gates; a set of six individual NAND gates of said means for switching having an input and an output, said input of each individual NAND gate being connected to the output of one of the NAND gates of said first group of NAND gates and to the output of one of the NAND gates of said second group of NAND gates, and the output being connected to the second data input of said trigger having its first data input directly connected to said NAND gates of said first group of NAND gates and of said second group of NAND gates connected to the respective individual NAND gate;

a decoder of inoperative states of said triggers having six inputs and an output, each of said inputs being connected to the output of one of said triggers and the output being connected to said first and second setting inputs of said six triggers.

* * * * *